July 1, 1958  C. SENN  2,841,117
PRESSURE FLUID SERVOMOTOR
Filed July 11, 1955
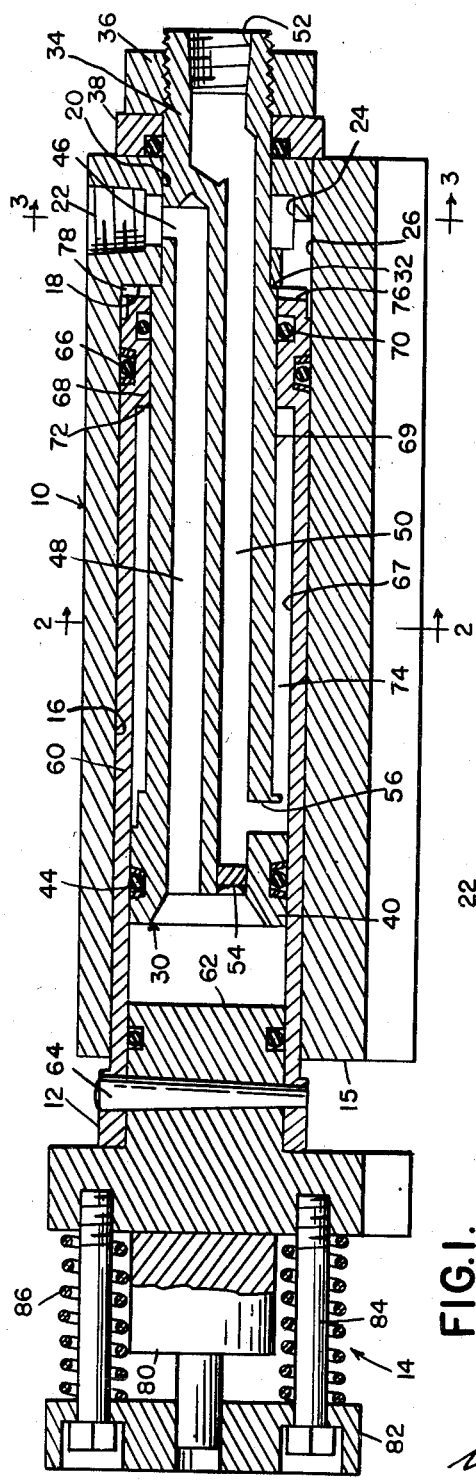
FIG.1.
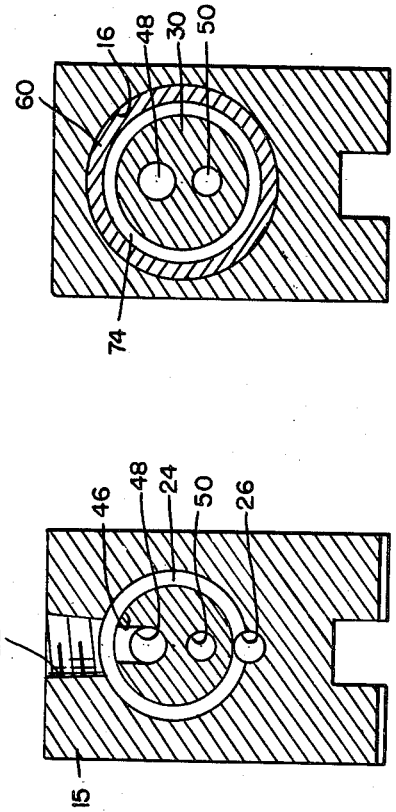
FIG.2.
FIG.3.
INVENTOR.
CHARLES SENN
BY
Whittemore, Hulbert & Belknap
ATTORNEYS

United States Patent Office 2,841,117
Patented July 1, 1958

2,841,117

PRESSURE FLUID SERVOMOTOR

Charles Senn, Detroit, Mich.

Application July 11, 1955, Serial No. 521,113

2 Claims. (Cl. 121—38)

The present invention relates to a pressure fluid servomotor including a piston and cylinder unit characterized by the relatively great force exerted thereby in view of the relatively small size of the cylinder.

It is an object of the present invention to provide a piston and cylinder device having the parts thereof relatively movable in working and return strokes, in which much greater force is exerted in the working stroke.

It is a further object of the present invention to provide a structure as defined in the preceding paragraph, in which the force exerted during the working stroke exceeds the product of the area of the cylinder and the pressure of the actuating fluid.

Other objects and features of the invention will become apparent as the description proceeds, especially when taken in conjunction with the accompanying drawings, wherein:

Figure 1 is a central longitudinal section through the unit.

Figure 2 is a sectional view on the line 2—2, Figure 1.

Figure 3 is a section on the line 3—3, Figure 1.

The unit comprises generally the cylinder assembly 10, the piston assembly 12, and the piercing tool indicated generally at 14.

The cylinder assembly 10 comprises a body 15 preferably formed from rectangular bar stock and has a main cylindrical bore or cylinder 16 extending from one end and terminating at a shoulder 18 adjacent the other end. A smaller bore 20 extends through the other end of the body 15. In the part of the body 15 having the reduced bore 20, there is provided a threaded radial passage 22 which communicates with an annular recess 24. At one end of the main cylinder 16 there is provided a small passage 26 for a purpose which will presently appear. Passage 22 is provided for connection to a source of fluid pressure for actuating the unit on its working stroke.

The cylinder assembly also includes a fixed stem or core indicated generally at 30 which fits snugly within the reduced bore 20 and which has a shoulder 32 seated against shoulder 18. The outer end 34 of the core 30 projects beyond the end of the body 15, and is threaded to receive a nut 36 which clamps the core in assembled position through a seal 38. At its inner or free end, which is located within the main cylinder 16 of the body 15, the core has an enlarged head 40 having an annual seal indicated generally at 44.

The core 30 has a radial passage 46 communicating through annular channel 24 with passage 22, and passage 46 in turn communicates with axial passage 48, which opens through the head 40 into the main cylinder 16. A second passage 50 is provided longitudinally of core 30 communicating in offset relation with threaded coupling connection 52 for connection to a source of fluid pressure for retracting the piston. The inner end of passage 50 is plugged at 54 and transverse passage 56 connects passage 50 to the interior of main cylinder 16.

The piston assembly 12 comprises a sleeve or shell 60 closed at its outer end by a tool supporting head 62, a tapered pin 64 connecting the sleeve and head. The sleeve and head together define a cup-like piston, in which the main actuating pressure acts against the inner surface of head 62.

However, additional force is applied to the piston assembly at a different point as will now be described.

The sleeve 60 has its outer surface slidable within the main cylinder 16 and sealing means indicated at 66 are provided. The intermediate portion of the sleeve 60 has an inner surface 67 slidably receiving the enlarged head 40 of the core 30 and sealed thereto by seal 44. At the end of the sleeve 60 opposite the head 62, the sleeve is provided with a radially inwardly extending flange 68 slidable upon the outer surface 69 of the core 30 and having sealing means indicated at 70. The flange 68 has an annular shoulder 72 facing an annular chamber 74 defined between the inner surface 67 of the sleeve, the outer surface 69 of the core, and the head 40 of the stem. The end surface 76 of the flange 68 faces an annular chamber 78 defined by outer surface 69 of the core, the surface 16 of the main cylinder and shoulder 18.

The piercing tool 14 comprises a punch 80 fixed to the head 62, and a stripper plate 82 slidable on headed pins 84 and urged to the illustrated position by springs 86.

In operation, passages 22 and 52 are connected through suitable valve means adapted to apply fluid pressure to either passage and simultaneously to connect the other passage to exhaust. To carry out a piercing stroke, fluid pressure is admitted through passage 22, channel 24, and passage 48 to the cylinder where it acts against the entire area of the head 62. At the same time, however, pressure is admitted through channel 24, and passage 26 to chamber 78, thus applying pressure to the annular area of the end surface 76 of the sleeve 60. It will be observed that the total area of the piston assembly exposed to working pressure thus exceeds the total cross-sectional area of the main cylinder 16 by a substantial amount, thus increasing power without having to increase the size of the equipment.

For return of the piston, fluid pressure admitted through passage 52 reaches annular chamber 74 through passages 50 and 56, and is effective to return the piston by acting on annular surface 72.

The drawings and the foregoing specification constitute a description of the improved piercing tool in such full, clear, concise and exact terms as to enable any person skilled in the art to practice the invention, the scope of which is indicated by the appended claims.

What I claim as my invention is:

1. A pressure fluid servomotor comprising a body member having a main cylindrical bore extending longitudinally thereof from one end through the greater portion of its length with a coaxial bore of smaller diameter extending through the remaining portion, said smaller bore having an enlargement within its length forming an annular recess connecting to a radial port in said body member, said recess also having another passage connecting it to said main bore, a core member within said bores including a shank portion fitting said smaller diameter bore extending outward beyond the same having an annular shoulder at its inner end and a clamping nut on its outer portion, said core member also including an externally cylindrical portion beyond said shoulder extending the greater part of the length of said main bore coaxial therewith with an enlarged diameter head at its inner end, said core member further having two channels extending longitudinally therewithin from the shank portion through the portion within said main bore, one of said channels being open through the inner end of said core and the other connecting to said annular recess, a tubular piston member sleeved over said core member externally fitting said main bore and internally for the greater portion of its length fitting over said head, also having at its inner end a radially inwardly extending head fitting the portion of said core intermediate its enlarged head and said shank portion and forming between the same and the core head an annular chamber, a head closing the outer end of said tubular piston forming thereof a closed cup and also constituting a tool support, and external fluid connections to said channel within said core, one through said radial port passing fluid to the chamber within said cupped piston and the other to said annular chamber between said core and tubular piston.

2. The construction as in claim 1 in which said channels in said core member are formed by bores from its free end, one terminating in a port to said annular recess and the other intersecting the port adjacent said core head and further communicating with an external fluid connection to the outer end of said core, and a stop in said last mentioned bore between said intersecting port and the free end of the core.

References Cited in the file of this patent
UNITED STATES PATENTS

| | | |
|---|---|---|
| 786,409 | Coon | Apr. 4, 1905 |
| 1,441,097 | Laughlin | Jan. 2, 1923 |
| 1,509,000 | Simpson | Sept. 16, 1924 |
| 1,548,559 | Simpson | Aug. 4, 1925 |
| 2,402,848 | Senn | June 25, 1946 |
| 2,587,893 | Pridy | Mar. 4, 1952 |
| 2,660,319 | Dorland | Nov. 24, 1953 |
| 2,804,849 | Cyran | Sept. 3, 1957 |